(12) United States Patent
Langhammer

(10) Patent No.: US 9,069,624 B1
(45) Date of Patent: Jun. 30, 2015

(54) SYSTEMS AND METHODS FOR DSP BLOCK ENHANCEMENT

(75) Inventor: Martin Langhammer, Salisbury (GB)

(73) Assignee: Altera Corporation, San Jose, CA (US)

( * ) Notice: Subject to any disclaimer, the term of this patent is extended or adjusted under 35 U.S.C. 154(b) by 382 days.

(21) Appl. No.: 13/555,907

(22) Filed: Jul. 23, 2012

(51) Int. Cl.
*G06F 7/53* (2006.01)

(52) U.S. Cl.
CPC ............. *G06F 7/5324* (2013.01); *G06F 7/53* (2013.01)

(58) Field of Classification Search
CPC ....... G06F 7/5324; G06F 7/5338; G06F 7/53; G06F 2207/3828; G06F 7/523; G06F 7/5318
USPC ................................................ 708/620, 625
See application file for complete search history.

(56) References Cited

U.S. PATENT DOCUMENTS

| | | | | |
|---|---|---|---|---|
| 5,586,070 A | * | 12/1996 | Purcell | 708/620 |
| 6,523,055 B1 | * | 2/2003 | Yu et al. | 708/620 |
| 7,266,580 B2 | * | 9/2007 | Busaba et al. | 708/625 |

* cited by examiner

*Primary Examiner* — Tan V. Mai
(74) *Attorney, Agent, or Firm* — Ropes & Gray LLP

(57) ABSTRACT

Methods and systems for signal processing using processing blocks are provided. In one embodiment of the disclosure, there are provided a plurality of multiplier circuitries and control circuitry configured to multiply numbers AB and CD. The number AB includes components A and B, and the component A includes subcomponents $A_H$ and $A_L$. The number CD includes components C and D, and the component C includes subcomponents $C_H$ and $C_L$. The control circuitry is configured to compute a partial product AD based on multiplying D and $A_L$ using a first multiplier circuitry and based on multiplying D and $A_H$ the using a first multiplier module of a second multiplier circuitry. The control circuitry is also configured to compute a partial product CB based on B and $C_L$ using a third multiplier circuitry and based on multiplying B and the $C_H$ using a second multiplier module of the second multiplier circuitry.

22 Claims, 10 Drawing Sheets

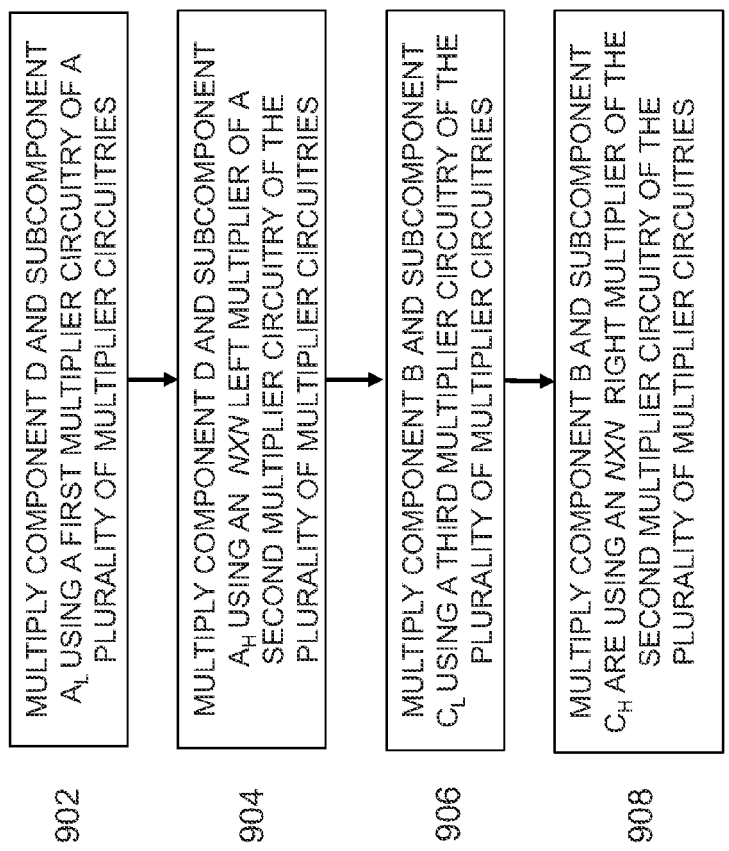

SYSTEMS AND METHODS FOR DSP BLOCK ENHANCEMENT

BACKGROUND

The present disclosure relates to processing blocks for performing functions such as digital signal processing. In particular, the present disclosure relates to methods and systems for providing enhanced processing blocks used to perform multiplication.

A processing block, such as a digital signal processing (DSP) block, is a block of circuitry, that may be separate from the general-purpose programmable logic of a device on which it is implemented. The processing block may be at least partially hard-wired to perform a specific function such as calculating a mathematical function. The processing block may also be partially programmable to perform a specific function such as calculating a mathematical function. The processing block may be part of an integrated circuit.

Some DSP applications may require processing blocks to support certain operations, such as computing a double precision (e.g., 64 bit long) product of two double precision numbers. For example, the MATH.H library used in the C/C++ programming languages requires compliant systems to support of double precision multiplication. Additionally, the ADSPB and OpenCL standards require MATH.H, and thus require compliant systems to support for double precision multiplication. The IEEE 754 standard also requires support of requiring compliant systems to support double precision multiplication. Implementation of double precision multipliers compliant with the above standards may require utilization of a high number of DSP processing blocks.

SUMMARY

Methods and systems for signal processing using processing blocks are provided.

In one embodiment of the present disclosure, there is provided a system which includes a plurality of multiplier circuitries and control circuitry configured to multiply a number AB and a number CD. The number AB includes a component A and a component B, and the component A includes a subcomponent $A_H$ and a subcomponent $A_L$. The number CD includes a component C and a component D, and the component C includes a subcomponent $C_H$ and a subcomponent $C_L$. The control circuitry is configured to compute a partial product AD based on multiplying the component D and the subcomponent $A_L$ using a first multiplier circuitry of the plurality of multiplier circuitries and based on multiplying the component D and the subcomponent $A_H$ using a first multiplier module of a second multiplier circuitry of the plurality of multiplier circuitries. The control circuitry is further configured to compute a partial product CB based on multiplying the component B and the subcomponent $C_L$ using a third multiplier circuitry of the plurality of multiplier circuitries and based on multiplying the component B and the subcomponent $C_H$ using a second multiplier module of the second multiplier circuitry of the plurality of multiplier circuitries.

In another embodiment of the present disclosure, multiplier circuitry is provided. The multiplier circuitry includes a first multiplier module and a second multiplier module. The second multiplier module includes a first component multiplier and a second component multiplier. The multiplier circuitry also includes selection circuitry configured to provide, to the second component multiplier of the second multiplier module, an input signal from a group consisting of an input signal to the first component multiplier of the second multiplier module, an input signal to the first multiplier module, a low logical state signal vector and a high logical state signal vector.

In another embodiment of the present disclosure, a method for multiplying a number AB and a number CD, is provided. A partial product AD is computed based on multiplying a component A of the number AB and a component D of the number CD, where the component A includes a subcomponent $A_H$ and a subcomponent $A_L$. Computing the partial product AD includes multiplying the component D and the subcomponent $A_L$ using a first multiplier circuitry of a plurality of multiplier circuitries. Computing the partial product AD also includes multiplying the component D and the subcomponent $A_H$ the using a first multiplier module of a second multiplier circuitry of the plurality of multiplier circuitries. A partial product BC is computed based on multiplying a component C of the number CD and a component B of the number AB, where the component C includes a subcomponent $C_H$ and a subcomponent $C_L$. Computing the partial product BC includes multiplying the component B and the subcomponent $C_L$ using a third multiplier circuitry of the plurality of multiplier circuitries. Computing the partial product BC also includes multiplying the component B and the subcomponent $C_H$ the using a second multiplier module of the second multiplier circuitry of the plurality of multiplier circuitries.

BRIEF DESCRIPTION OF THE DRAWINGS

Further features of the invention, its nature and various advantages will be apparent upon consideration of the following detailed description, taken in conjunction with the accompanying drawings, in which like reference characters refer to like parts throughout, and in which:

FIG. 9 shows an illustrative flow diagram of an exemplary process for operating a memory interface system according to an embodiment of the present disclosure.

DETAILED DESCRIPTION

To provide an overall understanding of the invention, certain illustrative embodiments will now be described. However, it will be understood by one of ordinary skill in the art that the systems and methods described herein may be adapted and modified as is appropriate for the application being addressed and that the systems and methods described herein may be employed in other suitable applications, and that such other additions and modifications will not depart from the scope hereof.

The figures described herein show illustrative embodiments, however the figures may not necessarily not show and may not be intended to show the exact layout of the hardware components contained in the embodiments. The figures are provided merely to illustrate the high level conceptual layouts of the embodiments. The embodiments disclosed herein may be implemented with any suitable number of components and any suitable layout of components in accordance with principles known in the art.

Although some of the figures may indicate specific number of bits used in some of the illustrative embodiments, those numbers of bits may be provided by way of example only. The embodiments disclosed herein may be implemented to accommodate any suitable number of bits.

In some illustrative embodiments, vector notation will be used. In particular, an N bit long bit vector X will be written as X[N:1]. A subset of the bit vector X starting at bit y of the bit vector X and ending with bit z of the bit vector X will be written as X[y:z].

Figure 1:
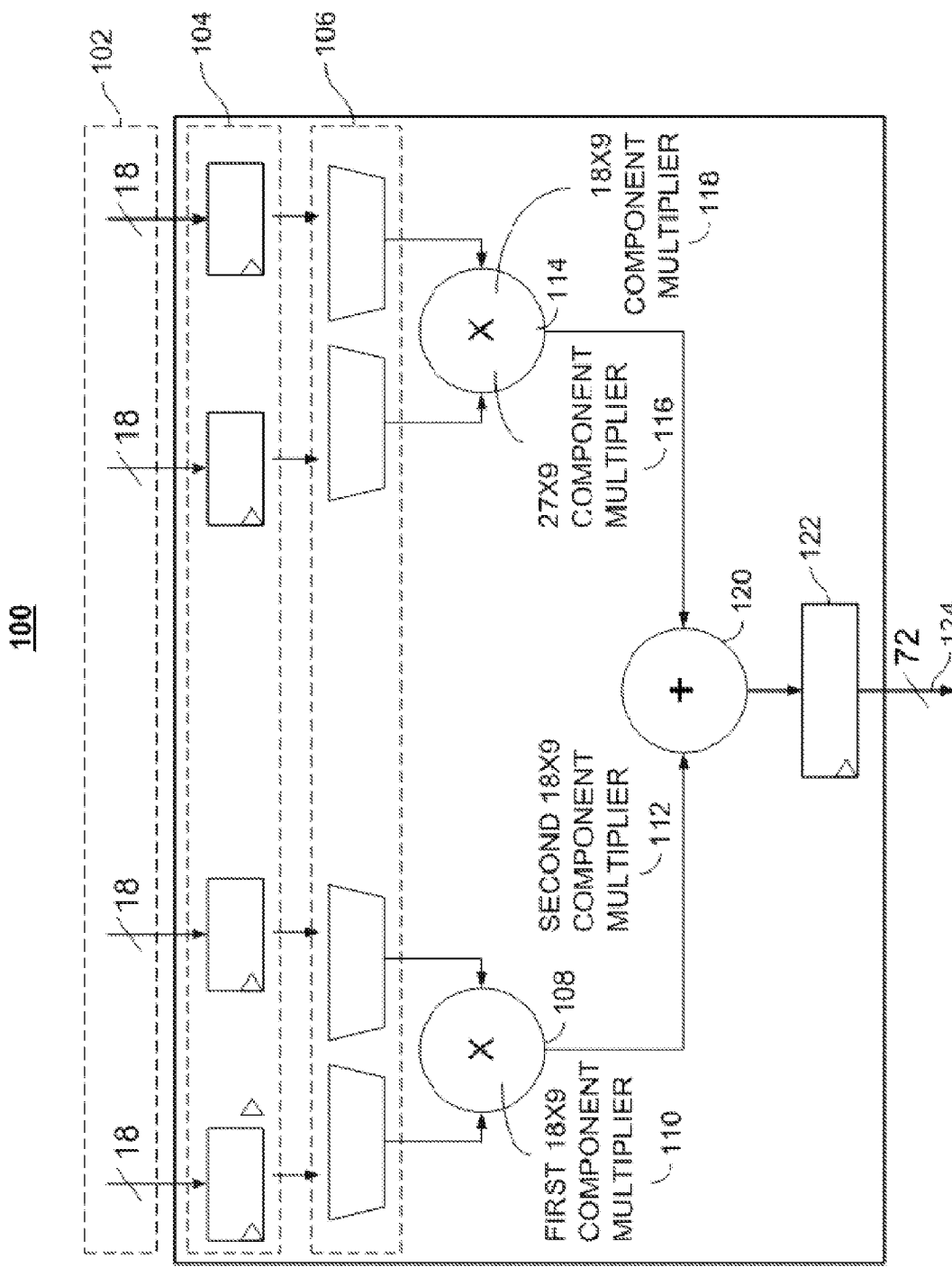
FIG. 1 shows an illustrative processing block in accordance with an embodiment of the present disclosure.

FIG. 1 shows illustrative processing block 100 in accordance with some embodiments of the present disclosure. Processing block 100 may include inputs 102, registers 104, configurable interconnect 106, configurable left multiplier 108, configurable component multipliers 110 and 112, configurable right multiplier 114, configurable component multipliers 116 and 118, configurable adder network 120, output register 122, and output 124.

In some embodiments, processing block 100 is a dedicated digital signal processing (DSP) block. In some embodiments, processing block 100 is a part of an integrated circuit device. In some embodiments, processing block 100 is part of a programmable logic device such as a field programmable gate array (FPGA). In some embodiments, processing block 100 may provide the ability to perform complex, high precision, and double precision number arithmetic. In some embodiments, processing block 100 is part of a larger system (e.g., an FPGA) that contains a plurality of configurably interconnected processing blocks substantially the same as processing block 100. In these embodiments processing block 100 may also operate in combination with other processing blocks to perform various mathematical functions.

Processing block 100 may perform various arithmetic operations on the inputs 102 to produce the output 122. The inputs 102 are input into the registers 104, which in turn may send the inputs 102 to the interconnect 106. The interconnect 106 may route various signals, e.g., the inputs 102 and/or values derived from the inputs 102, to various components of processing block 100, such as, for example, the multipliers 108 and 114. The multipliers 108 and 114 and the adder network 120 may perform various arithmetic operations to compute a mathematical function on inputs 102. For example, the mathematical function may be addition, subtraction, multiplication, or division on either real or complex numbers with varying bits of precision. The mathematical function may be associated with a mode of operation, e.g., complex number multiplication mode, high precision multiplication mode, or double precision multiplication mode.

Processing block 100 may be configured to operate in a particular mode via control signals (not shown) input into interconnect 106. For a particular mode, these control signals may provide specific signal routing instructions to interconnect 106 so that processing block 100 may compute a specific mathematical function in accordance with the mode.

In some embodiments, the inputs 102 may contain 108 bits. The inputs 102 may represent a single number or various combinations of numbers. For example, the inputs 102 may represent a single 108 bit long number by using all 108 bits of input used to represent the 108 bit long number. The inputs 102 may be used to represent two separate 54 bit long numbers by using 54 bits of input to represent the first 54 bit long number and another 54 bits of input to represent the second 54 bit long number. Inputs 102 may also be used to represent two separate 36 bit long numbers by using 36 bits of input to represent the first 36 bit long number and another 36 bits of input to represent the second 36 bit long number and leaving 36 bits of input unused. Inputs 102 may also be used to represent a complex number with a 36 bit long real component and a 36 bit long complex component by representing the real component using 36 bits of inputs 102 and the complex component using another 36 bits of inputs 102.

Processing block 100 may also include one or more pre-adder stages (not shown) whose outputs may be routed to the input of each of the multipliers 108 and 114 by the interconnect 106. Each pre-adder stage may include one or more adders that may be used to perform addition and/or subtraction. For example, each of the pre-adder stages may be used to compute one or more intermediate values derived from inputs 102 for later processing by the multipliers 108 and/or 114. The pre-adder stages may be required for certain modes of operation, such as for performing complex number multiplication or high precision number multiplication.

The interconnect 106 may route various signals, e.g., the inputs 102 and/or values derived from the inputs 102, to various components of processing block 100, such as the multipliers 108 and 114. The interconnect 106 may include multiple stages, i.e., groups, of multiplexers ("muxes") for routing the signals. For example, the interconnect 106 may include two mux stages. The first mux stage may include a group of muxes configured via control signals (not shown) input into the interconnect 106 to route signals from the inputs 102 to the input of each of the multipliers 108 and 114. Similarly, the second mux stage may include a group of muxes configured via control signals (not shown) input into interconnect 106 to route signals from the output of each of the multipliers 108 and 114 to the input of the adder stage 120. As mentioned above, the control signals may be associated with different modes of operation for processing block 100 so that processing block 100 may be configured to compute a number of different mathematical functions. For example, a mode of operation may be complex number multiplication mode, high precision number multiplication mode, or double precision number multiplication mode.

The adder network 120 may be a configurable adder network that includes one or more adders. The adder network 120 may include separate groups of adders, each allowing for a different addition and/or subtraction operation. The multiple addition and/or subtraction operations may occur at the same time, e.g., during the same clock cycle.

The register 122 may store the value of the output 122 of the mathematical function until the value of the output 122 is needed, for example, by a user or by some other hardware.

In some embodiments, the left multiplier 108 is an n×n multiplier (i.e., a multiplier that can multiply an n bit long number with another n bit long number). In some embodiments, n×n left multiplier 108 may be implemented using a first n×r component multiplier 110 and a second n×r component multiplier 112. In some embodiments, the right multiplier 114 is an n×n multiplier. In some embodiments, n×n right multiplier 114 may be implemented using an m×r component multiplier 116 and n×r component multiplier 118. Although the discussion below will concern a particular embodiment where m=27, n=18 and r=9, it will be appreciated by those skilled in the art that any suitable values of m, n and r may be used without departing from the scope of the present disclosure.

As discussed above, in some embodiments, the left multiplier 108 is an 18×18 multiplier—i.e., a multiplier that can multiply an 18 bit long number X[18:1] with another 18 bit long number Y[18:1]. The 18×18 left multiplier 108 may be implemented using a first 18×9 component multiplier 110 that multiplies X[18:1] and Y[9:1] and a second 18×9 component multiplier 112 that multiplies X[18:1] and Y[18:10]. The left multiplier 108 may further include circuitry to combine the outputs of the first 18×9 component multiplier 110 and the second 18×9 component multiplier 112.

In some embodiments, the right multiplier 114 is an 18×18 multiplier. The 18×18 right multiplier 114 may be implemented using an 27×9 component multiplier 116 and a second component second 18×9 component multiplier 118. The left multiplier 108 may further include circuitry to combine the outputs of the first and second 18×9 component multipliers.

Processing block 100 may be configured to perform multiplications of two numbers, either by itself or in conjunction with other processing blocks. For instance, a single processing block 100 may perform 27×27 high-precision multiplication. In some embodiments, two processing blocks having a configuration substantially similar to a configuration of processing block 100 may in combination perform 36×36 multiplication. In some embodiments, four processing blocks having a configuration substantially similar to a configuration of processing block 100 may in combination perform 54×54 multiplication.

As discussed in the Background section above, a standard-compliant implementation (i.e., an implementation compliant with e.g., the OpenCL, ADSPB and IEEE 754 standards) of double precision multipliers may require utilization of a high number of DSP processing blocks. A minimum multiplier size that yields correct (i.e., standard-compliant) results for double precision multiplication is 53×53 (i.e., the 53×53 multiplier is capable of multiplying two 53 bit long numbers). Such multiplication can be performed by a 54×54 multiplier implemented by four processing blocks 100. However, in order to obtain standard-compliant results for calculations involving multiple multiplications, like calculation of elementary functions (e.g., division) or functions within MATH.H, use of 53×53 multipliers will not produce a standard-compliant result. This occurs because some precision is lost with each multiplication, meaning that several 54×54 multiplications—each standard-compliant by itself—may yield a non standard-compliant result (e.g., a result with only 48 bits of precision). In order to achieve standard-compliant results for elementary functions or MATH.H, multipliers of size 60×60 or above may be needed.

Multipliers of size above 60×60 may be implemented using processing blocks 100. For example, as discussed above, two processing blocks 100 may support computation of a 36×36 product. In some embodiments, due to the architecture of processing blocks 100, supporting computation of a 60×60 product using processing blocks 100 may require computation of a 72×72 product. A 72×72 product may be implemented by combining four 36×36 products, and so may be implemented using eight processing blocks 100. Thus, resource utilization of a 'standard' (i.e., implemented using 72×72 multiplication) standard-compliant multiplier may be relatively high, especially considering that MATH.H algorithms may require several 72×72 multiplications.

Resource savings may be achieved by performing truncated multiplication of double precision numbers. For example, computation of a 54×54 product may be implemented by combining four 27×27 partial products. Since a single processing block 100 may support computation of a 27×27 product, 54×54 multiplication may be implemented using four processing blocks 100. However, a 54×54 truncated multiplication of double precision numbers may not be compliant with the ADSPB, OpenCL and IEEE 754 standards.

In the following, schemes and circuitries will be described for performing 63×63 (i.e., standard-compliant) multiplication that requires substantially fewer resources (e.g., six processing blocks 100) than the 'standard' standard-compliant method described above. The schemes and circuitries described below require no datapath changes, and only small logic changes to the left multipliers 108 and the right 18×18 multipliers 114 of the processing blocks 100 (e.g., addition of several 2:1 multiplexors and AND gates).

Additionally, in the following, schemes and circuitries will be described for performing truncated multiplication, yielding additional resource savings. For example, in some embodiments, truncated multiplication may be performed using 4, 4.5, 5, or 5.5 processing blocks 100. Implementations of the truncated multiplication schemes and circuitries may be standard-compliant, while requiring only small additional modifications (relative to the 63×63 schemes and circuitries) of the right 18×18 multipliers 114 of the processing blocks 100.

Figure 2:
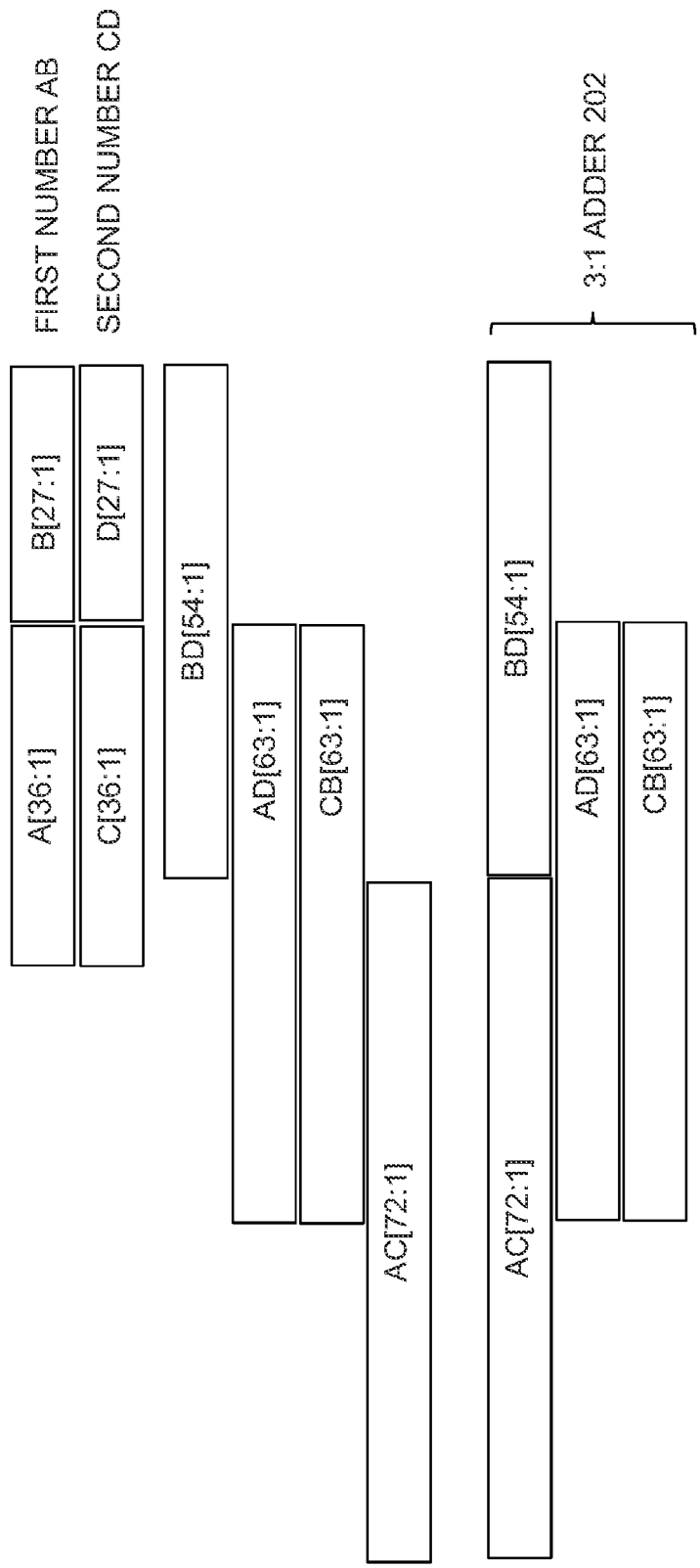
FIG. 2 shows an exemplary scheme for performing multiplication in accordance with an embodiment of the present disclosure.

FIG. 2 shows an exemplary scheme 200 for performing multiplication in accordance with an embodiment of the present disclosure. In some embodiments scheme 200 may be implemented using a plurality of processing blocks having a structure that is substantially the same as processing block 100 shown in FIG. 1. However, it will appreciated by those skilled in the art that scheme 200 may be implemented either independently from or as part of circuitries other than processing block 100 of FIG. 1 without departing from the spirit and scope of the present disclosure.

Scheme 200 relates to performing p×p multiplication—that is, multiplying a first p bit long number AB by a second p bit long number BC. The first number AB is partitioned into an l bit component A and an m bit long component B. The second number CD is partitioned into an l bit long component C and an m bit long component D. The discussion below will concern embodiments where p=63, m=27, n=18 and r=9. However, it will be appreciated by those skilled in the art that any suitable values of p, m, n and r may be used without departing from the scope of the present disclosure.

A product of the 63 bit long numbers AB and CD may be obtained by combining partial products BD, AD, CB, and CA, obtained by multiplying components B and D, A and D, C and B, and C and A, respectively.

Computing a partial product BD of the 27 bit long components B and D involves performing a 27×27 multiplication. Accordingly, as described above, the partial product BD may be computed using a single processing block 100.

Computing a partial product AC of the 36 bit long components A and C involves performing a 36×36 multiplication. Accordingly, as described above, the partial product AC may be computed using two processing blocks 100.

Computing a product AD of the 36 bit long component A and the 27 bit long component D involves performing a 36×27 multiplication. Likewise, computing a product CB of the 36 bit long component C and the 27 bit long component B involves performing a 36×27 multiplication. In some embodiments, as will be discussed below, partial products AD and CB may be computed using a total of three processing blocks 100.

The four partial products AC, BD, AD, and BC may be appropriately aligned and added together using adder 202, using the logical arrangement of the four partial products as shown in FIG. 2. In some embodiments, such as when the functionality of processing block 100 is implemented by the STRATIX V DSP BLOCK available from Altera Corporation, adder 202 may be physically configured to be a three-input adder, and the four partial components may be added together using the three input adder 202. This is possible because the most significant bit (MSB) of the partial product BD corresponds to a bit position that immediately precedes a bit position of the least significant bit (LSB) of the partial product AC, allowing the partial products BD and AC to be concatenated into a single 126 bit long number. However, it will be appreciated by those skilled in the art that the physical implementation of the logical arrangement for adding the four partial products as shown in FIG. 2 may differ from the logical arrangement (e.g., the adder 202 may be a four-input adder) without departing from the scope and spirit of the present disclosure.

In some embodiments, when the adder 202 is a three-input adder 202, the adder 202 may be implemented using the functionality of and interconnections between processing blocks 100. In particular, as described above, a single processing block 100 may be configured as a 27×27 multiplier to produce the 54 bit long partial product BD. The 72 bit long partial product AC may be implemented by directly combining two processing blocks 100 configured as independent 27×27 multipliers. As will be shown below, the 63 bit long partial products AD and BC may be implemented using three modified processing blocks 100 configured to implement two 36×27 multiplications. The two 36×27 multiplications may be implemented together as the sum of two 27×27 multiplications (each implemented by a processing block 100 computing the product A[27:1]×D[27:1] and C[27×1]×B[27:1], respectively) which is added with the sum of two 27×9 multiplications (both implemented using a single processing block 100 computing D[27:1]×A[36:28] and B[27×1]×C[36:28]), where the results of the two 27×9 multiplications are left shifted by 27 bits relative to the results of the two 27×27 multiplications.

The three input adder 202 may be configured as follows. For convenience, the output of the adder 202—i.e., the result of the 63×63 multiplication—will be referred to as R[126:1]. No adder is needed for R[27:1], since BD[27:1] is directly output as R[27:1]. R[54:28] may be computed using a two-input component adder adding BF[54×28] and the 27 least significant bits of the sum of partial products A[27:1]×D[27:1] and C[27×1]×B[27:1]. R[92:55] may be implemented as a three-input adder, where the first input is AC[38:1], the second input is the 28 most significant bits of the sum of A[27:1]×D[27:1] and B[27:1]×C[27×1], preceded by 10 zeros, and the third input is the sum of D[27:1]×A[36:28] and B[27:1]×C[36:28]. R[126:93] may be computed using a two-input component adder that produces the sum of AC[72:39] and the carry-in generated by the three-input component adder.

Figure 3A:
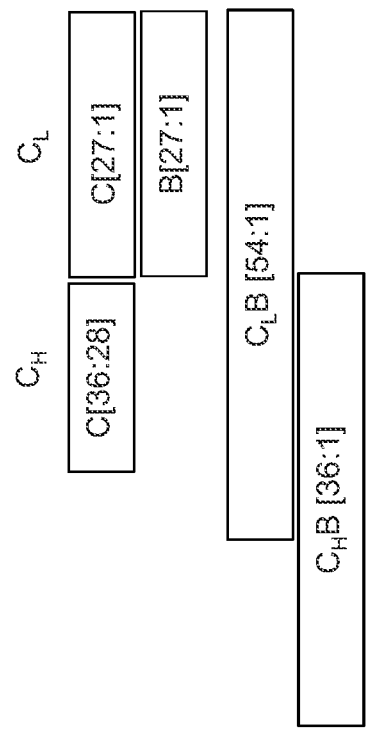
FIG. 3A shows a further exemplary scheme for performing multiplication in accordance with an embodiment of the present disclosure.

FIG. 3A shows an exemplary scheme 300 for performing multiplication in accordance with an embodiment of the present disclosure. In some embodiments, scheme 300 may be implemented using the left component multiplier 108 or the right component multiplier 114 of the processing block 100 shown in FIG. 1. However, it will appreciated by those skilled in the art that scheme 300 may be implemented either independently from or as part of circuitries other than processing block 100 of FIG. 1 without departing from the spirit and scope of the present disclosure.

Scheme 300 relates to computing the partial product AD of the 36 bit long component A and the 27 bit long component D by performing a 36×27 multiplication.

The 36 bit long component A[36:1] may be partitioned into a 9 bit long subcomponent $A_H$ (i.e., A[36:28]) and a 27 bit long subcomponent $A_L$ (i.e., A[27:1]). Accordingly, the partial product AD may be obtained by adding a product $A_L D$ of the subcomponent $A_L$ and the component D with a properly aligned product $A_H D$ of the subcomponent $A_H$ and the component D. Computing the product $A_L D$ involves a 27×27 multiplication, which, as discussed above, may be implemented using a single processing block 100. Computing the product $A_H D$ involves a 27×9 multiplication. As will be shown below in the discussion related to FIG. 4, the 27×9 multiplication may be performed using a left 18×18 component multiplier of a single processing block 100. For ease of reference, this processing block 100 will be referred to as a 'shared processing block 100'.

Figure 4:
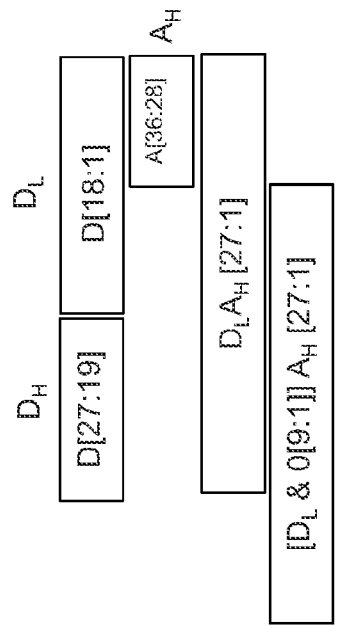
FIG. 4 shows a further exemplary scheme for performing multiplication in accordance with an embodiment of the present disclosure.
Figure 4:
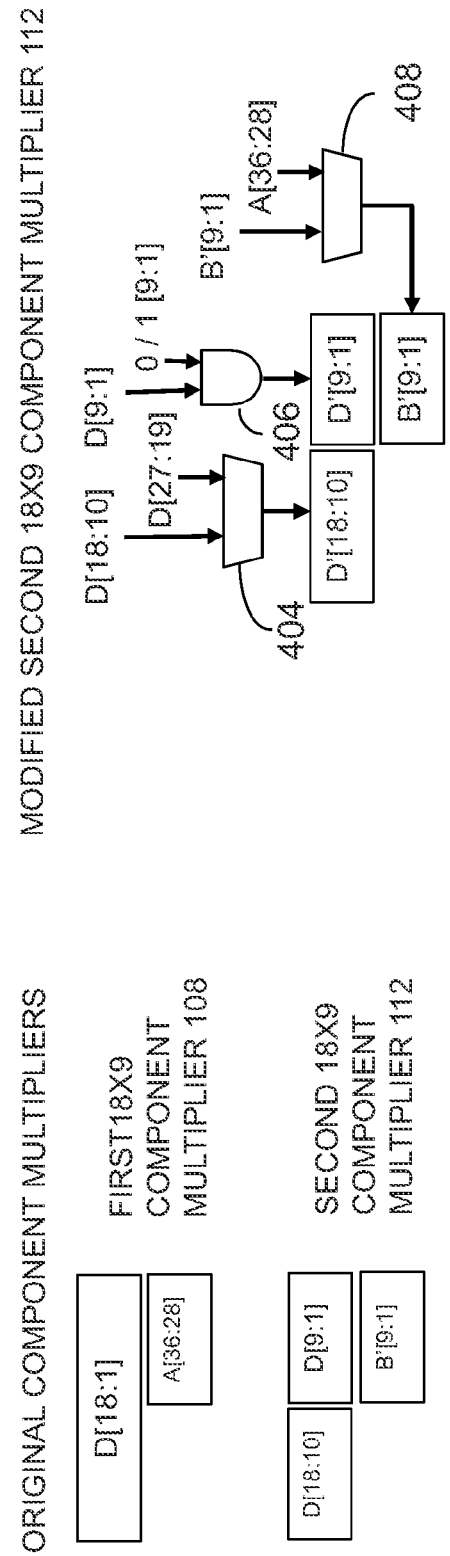

FIG. 4 shows an exemplary scheme 400 for performing multiplication in accordance with an embodiment of the present disclosure. In some embodiments, scheme 400 may be implemented using the left component multiplier 108 of the processing block 100 shown in FIG. 1. However, it will appreciated by those skilled in the art that scheme 400 may be implemented either independently from or as part of circuitries other than processing block 100 of FIG. 1 without departing from the spirit and scope of the present disclosure.

Scheme 400 relates to computing the product $A_H D$ of the 9 bit long subcomponent $A_H$ (i.e., A[36:28]) and the 27 bit long component D by performing a 27×9 multiplication.

The 27 bit long component D[27:1] may be partitioned into a 9 bit long subcomponent $D_H$ (i.e., D[27:19]) and an 18 bit long subcomponent $D_L$ (i.e., D[18:1]). Accordingly, the product $A_H D$ may be obtained by adding a product $D_L A_H$ of the subcomponent $D_L$ and the subcomponent $A_H$ with a properly aligned product $D_H A_H$ of the subcomponent $D_H$ and the subcomponent $A_H$.

Computing the product $D_L A_H$ involves an 18×9 multiplication, which may be implemented using a first 18×9 component multiplier 110 of the left multiplier 108 of the shared processing block 100.

Computing the product $D_H A_H$ involves a 9×9 multiplication, where a position of an LSB of $D_H$ is shifted by 9 bits, such that the position of the LSB of the subcomponent $D_H$ immediately follows a position of an MSB of the subcomponent $A_H$. The product $D_H A_H$ may be obtained by appending 9 trailing zero bits to the subcomponent $D_H$, and multiplying the resulting 18 bit long vector [D[27:19] & 0[9:1]] with the 9 bit long vector $A_H$. The resulting 18×9 multiplication may be implemented using a modified second 18×9 component multiplier 112 of the left component multiplier 108 of the shared processing block 100.

As originally implemented, a second 18×9 component multiplier 112 of the left multiplier 108 of the shared processing block 100 is configured to multiply a first 18 bit long number D'[18:1] (i.e., D[18:1] in this embodiment) input into the left multiplier 108 and 9 bits of a second number B'[9:1] input into the left multiplier 108. That is, the second component multiplier 114 of the shared processing block 100 multiplies D'[18:1] by B'[9:1].

The second 18×9 component multiplier 112 of the shared processing block 100 may be modified as follows. A selection circuitry 404 may be used to provide either D[18:10] or D[27:19] as D'[18:10] for the 18 bit long input D'[18:1] of the second 18×9 component multiplier 112. An AND gate circuitry 406 may be used to provide D'[9:1] of the 18 bit long input D'[18:1] of the second 18×9 component multiplier 112. A first input of the AND gate circuitry 406 may be D[9:1], and a second input of the AND gate circuitry 406 may be either a 9 bit long vector of zeroes or a 9 bit long vector of ones. A selection circuitry 408 may be used to provide either B'[9:1] or A[36:28] as the 9 bit long input B'[9:1] of the second 18×9 component multiplier 112.

It should be noted that in some embodiments, a two-input selection circuitry 406 may be used in place of AND gate circuitry 406. The two-input selection circuitry 406 may be used to provide D'[9:1] of the 18 bit long input D'[18:1] of the second 18×9 component multiplier 112. In these embodiments, a first input of the selection circuitry 406 may be D[9:1], and a second input of the selection circuitry 406 may be a 9 bit long vector of zeroes.

The outputs of the selection circuitries 404 and 408 and the AND gate circuitry 406 may be configured such that D'[18:1]=[D[27:19] & 0[9:1]] and B'[9:1]=A[36:28]=$A_H$, causing the modified 18×9 component multiplier 112 to output the product $D_H A_H$. Alternatively, the outputs of the selection circuitries 404 and 408 and the AND gate circuitry 406 may be configured such that D'[18:1]=D[18:1] and B'[9:1]=B'[9:1], causing the modified 18×9 component multiplier 112 to output a product equal to a product that would be output by an unmodified 18×9 component multiplier 112.

Figure 3B:
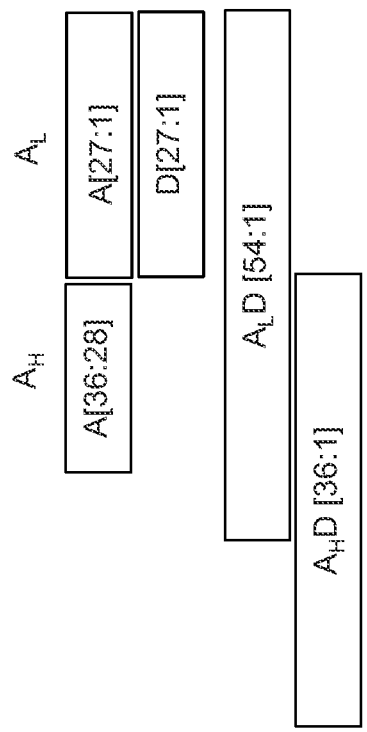
FIG. 3B shows a further exemplary scheme for performing multiplication in accordance with an embodiment of the present disclosure.

FIG. 3B shows an exemplary scheme 301 for performing multiplication in accordance with an embodiment of the present disclosure. In some embodiments, scheme 301 may be implemented using the left component multiplier 108 or the right component multiplier 114 of the processing block 100 shown in FIG. 1. However, it will appreciated by those skilled in the art that scheme 301 may be implemented either independently from or as part of circuitries other than processing block 100 of FIG. 1 without departing from the spirit and scope of the present disclosure.

Scheme 301 relates to computing the product CB of the 36 bit long component C and the 27 bit long component B by performing a 36×27 multiplication.

The 36 bit long component C[36:1] may be partitioned into a 9 bit long subcomponent $C_H$ (i.e., C[36:28]) and a 27 bit long subcomponent $C_L$ (i.e., C[27:1]). Accordingly, the partial product CB may be obtained by adding a product $C_L$B of the subcomponent $C_L$ and the component B with a properly aligned product $C_H$B of the subcomponent $C_H$ and the component B. Computing the product $C_L$B involves a 27×27 multiplication, which, as discussed above, may be implemented using a single processing block 100. Computing the product $C_H$B involves a 27×9 multiplication. The 27×9 multiplication may be performed using a 27×9 component multiplier 116 of the right 18×18 component multiplier 114 of the shared processing block 100. It should be noted that in 'full-precision' 63×63 multiplication mode (i.e., when no truncation is involved in the multiplication of the numbers AB and CD), a 18×9 component multiplier 118 of the right 18×18 component multiplier 114 of the shared processing block 100 is not used.

In light of the above, the partial products AD and BC may be computed using three processing blocks 100—a first processing block 100 for computing the 27×27 product $A_L$D, a second processing block 100 for computing the 27×27 product $C_L$B, and the shared processing block 100 for computing the 27×9 product $A_H$D and the 27×9 product $C_H$B. As shown above, the partial product AC may be computed using two processing blocks 100 and the partial product BD may be computed using a single processing block 100. Accordingly, the 63×63 product of the number AB and the number CD may be computed using a total of six processing blocks 100.

Thus, an enhanced standard-compliant multiplication scheme (compliant with the IEEE 754, OpenCL and ADSPB standards) using the 63×63 multiplier described above may be implemented using six processing blocks 100. For comparison purposes, a 'standard' standard-compliant multiplication scheme using 72×72 multiplication scheme based on decomposing the 72×72 multiplication into a combination of two 54×54 multiplications uses eight processing blocks 100 to implement. Advantageously, the enhanced standard-compliant multiplication scheme requires two fewer processing blocks 100 than the 'standard' standard-compliant multiplication scheme.

Figure 5:
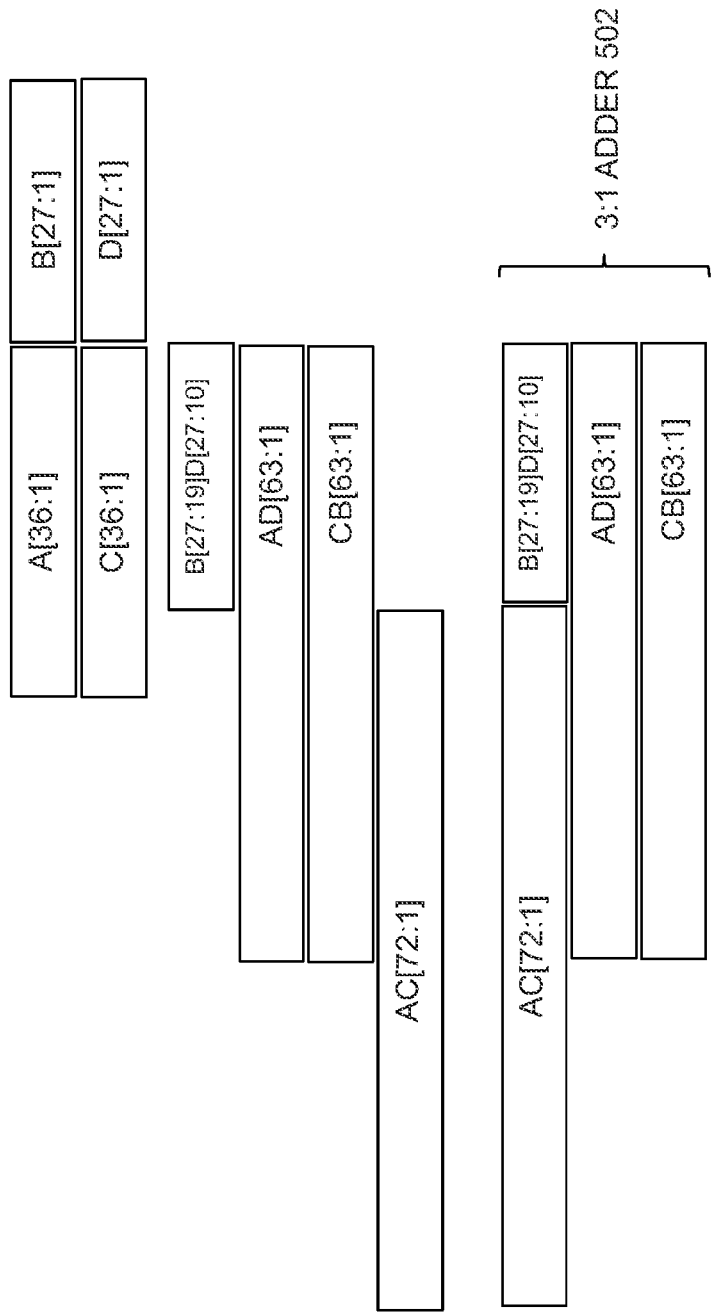
FIG. 5 shows a further exemplary scheme for performing multiplication in accordance with an embodiment of the present disclosure.

FIG. 5 shows an exemplary scheme 500 for performing multiplication in accordance with an embodiment of the present disclosure. In some embodiments, scheme 500 may be implemented using a plurality of processing blocks having a structure that is substantially the same as processing block 100 shown in FIG. 1. However, it will appreciated by those skilled in the art that scheme 500 may be implemented either independently from or as part of circuitries other than processing block 100 of FIG. 1 without departing from the spirit and scope of the present disclosure.

Scheme 500 relates to performing a truncated multiplication of the number AB and the number CD. Similarly to the 'full-precision' 63×63 multiplication scheme 200, scheme 500 partitions the 63 bit long numbers AB and CD into components A, B, C and D, and computes partial products AC, AD and CB, as well as a truncated partial product $BD_T$. The partial products AC and $BD_T$ are concatenated, and [AC & $BD_T$], AD and CB are properly aligned and added using a three input adder 502.

The partial product AC may involve a 36×36 multiplication, and may be computed using two processing blocks 100.

The partial products AD and CB may be computed according to schemes 300, 301 and 400 described in connection with FIGS. 3A, 3B and 4, using three processing blocks 100.

If the partial product $BD_T$=B[27:10]D[27:10] (an embodiment not shown in FIG. 5), the partial product $BD_T$ involves an 18×18 multiplication of the 18 bit long component B[27:10] and the 18 bit long component D[27:10]. The 18×18 partial product $BD_T$ may be implemented using either a left multiplier 108 or a right multiplier 114 of a single processing block 100 (i.e., using one half of a single processing block 100). Accordingly, a 63×63 multiplication using a partial product $BD_T$=B[27:10]D[27:10] obtained via 18×18 multiplication may be implemented using 5.5 processing blocks 100—one half of a processing block less than the six processing blocks 100 used to implement a 'full-precision' 63×63 multiplication according to schemes 300, 301 and 400, as described in connection with FIGS. 3A, 3B, and 4, respectively.

If the partial product $BD_T$=B[27:19]D[27:10], the partial product $BD_T$ involves an 18×9 multiplication of the 18 bit long component D[27:10] and the 9 bit long component B[27:19]. As will be shown below, the partial product $BD_T$ may be computed using a modified 18×9 component modifier 118 of the right multiplier 114 of the shared processing block 100.

Figure 6A:
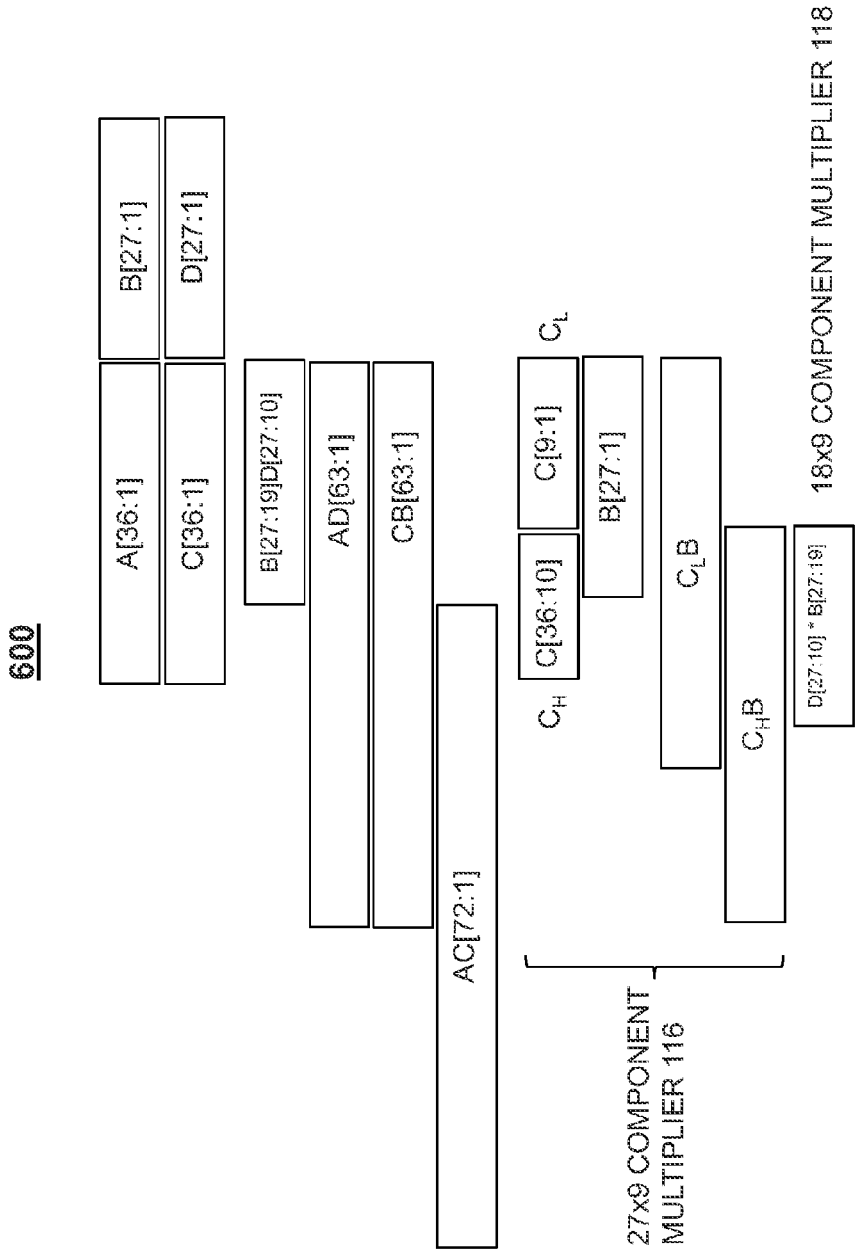
FIG. 6A shows a further exemplary scheme for performing multiplication in accordance with an embodiment of the present disclosure.

FIG. 6A shows an exemplary scheme 600 for performing multiplication in accordance with an embodiment of the present disclosure. In some embodiments scheme 600 may be implemented using a plurality of processing blocks having a structure that is substantially the same as processing block 100 shown in FIG. 1. However, it will appreciated by those skilled in the art that scheme 600 may be implemented either independently from or as part of circuitries other than processing block 100 of FIG. 1 without departing from the spirit and scope of the present disclosure.

Scheme 600 relates to performing a truncated multiplication of the number AB and the number CD, as described previously in connection with scheme 500 of FIG. 5.

If the partial product $BD_T$=B[27:19]D[27:10], the partial product $BD_T$ involves an 18×9 multiplication of the 18 bit long component D[27:10] and the 9 bit long component B[27:19]. The partial product $BD_T$=B[27:19]D[27:10] may be computed using an 18×9 component modifier 118 of the right multiplier 114 of the shared processing block 100. However, the 18×9 component modifier 118 of the shared processing block 100 may need to be modified in order to achieve correct bit alignment of the truncated partial product $BD_T$ with respect to the partial products AC, AD and BC.

If the shared processing block 100 is modified to implement 'full-precision' 63×63 multiplication via schemes 300, 301 and 400 as described in connection with FIGS. 3A, 3B and 4, respectively, the modified 27×9 component multiplier of the shared processing block 100 multiplies B[27:1] and C[36:28]. The 18×9 component multiplier 118 of the shared block 100 is not used in 'full-precision' 63×63 multiplication (i.e., the inputs to the 18×9 component multiplier 118 are zeroed using control circuitry not shown in FIG. 6A). However, when the shared processing block 100 (or any unmodified processing block 100) is required to implement a 27×27 multiplication of two numbers (e.g., B'[27:1] and D[27:1]), the 18×9 component multiplier 118 is used to multiply D[27:10] and B'[9:1]. In order to maintain the 27×27 multiplication functionality of the shared processing block 100, while allowing for computation of the partial product $BD_T$, a selection circuitry (such as, e.g., the selection circuitry 602 as described below in connection with FIG. 6B) may be used to provide either B'[9:1] or B[27:19] as an input B'[9:1] of the 18×9 component multiplier 118 of the shared processing block 100.

A modified 18×9 component multiplier 118 of the shared processing block 100 may output the 27 bit long product $BD_T$=B[27:19]D[27:10]. However, simply multiplying B[27:19] with D[27:10] may not yield a correctly aligned result, since the LSBs of B[27:19] and D[27:10] are not aligned—i.e., the LSB of B[27:19] is shifted 9 bits to the left with respect to the LSB of D[27:10]. Accordingly, the product $BD_T$ may need to be shifted to the right by 9 bits in order to correctly align $BD_T$ with respect to the partial products AC, AD and CB. Circuitries for performing this alignment will be shown in FIGS. 6B and 6C.

Once the truncated partial product $BD_T$ is correctly aligned, it may be combined with the partial products AC, AD and BD. Because scheme 600 computes the partial product $BD_T$ using the same shared processing circuitry 100 used to compute products $A_HD$ and $C_HB$, scheme 600 does not require use of a separate processing block 100 in order to compute the partial product BD. Accordingly, scheme 600 may be used to implement the truncated 63×63 multiplication of the numbers AB and CD using five processing blocks 100 —one less than the six processing blocks 100 used to implement 'full-precision' 63×63 multiplication according to schemes 300, 301 and 400, as described in connection with FIGS. 3A, 3B, and 4, respectively.

Figure 6C:
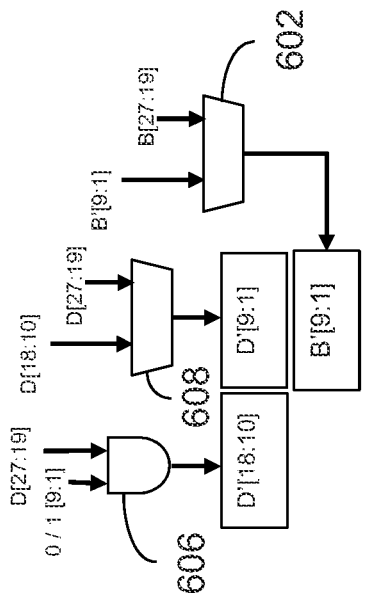
FIG. 6C shows further illustrative multiplier circuitry for performing multiplication in accordance with an embodiment of the present disclosure.
Figure 6B:
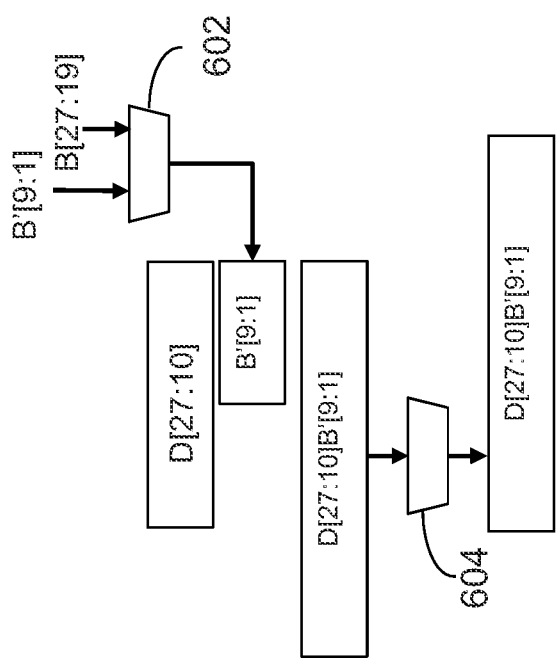
FIG. 6B shows illustrative multiplier circuitry for performing multiplication in accordance with an embodiment of the present disclosure.

FIG. 6B shows illustrative multiplier circuitry 601 for performing multiplication in accordance with an embodiment of the present disclosure. In some embodiments the multiplier circuitry 601 may be a part of processing block 100 shown in FIG. 1. However, it will appreciated by those skilled in the art that multiplier circuitry 601 may be implemented either independently from or as part of circuitries other than processing block 100 of FIG. 1 without departing from the spirit and scope of the present disclosure.

Multiplier circuitry 601 may be part of the 18×9 component multiplier 118 of the shared block 100, and may be used to compute the product $BD_T$=B[27:19]D[27:10], as described previously in connection with scheme 500 of FIG. 5. The selection circuitry 602 may be used to provide either B'[9:1] or B[27:19] as an input B'[9:1] of the 18×9 component multiplier 118 of the shared processing block 100. A modified 18×9 component multiplier 118 of the shared processing block 100 may output the 27 bit long product $BD_T$=B[27:19]D[27:10]. However, as described above in connection with FIG. 6A, product $BD_T$ may need to be shifted to the right by 9 bits in order to align correctly with respect to the partial products AC, AD and CB. Shifting circuitry 604 (e.g., a multiplexor) may be used to perform the 9 bit right shift. In some embodiments, the shifting circuitry 604 may be included in the modified 18×9 component multiplier 118 of the shared processing block 100. In some embodiments, the shifting circuitry 604 may be implemented wholly or partially outside of the modified 18×9 component multiplier 118 of the shared processing block 100.

FIG. 6C shows illustrative multiplier circuitry 603 for performing multiplication in accordance with an embodiment of the present disclosure. In some embodiments the multiplier circuitry 603 may be a part of processing block 100 shown in FIG. 1. However, it will appreciated by those skilled in the art that multiplier circuitry 603 may be implemented either independently from or as part of circuitries other than processing block 100 of FIG. 1 without departing from the spirit and scope of the present disclosure.

Multiplier circuitry 603 may be part of the 18×9 component multiplier 118 of the shared block 100, and may be used to compute the product $BD_T$=B[27:19]D[27:10]. However, as described previously in connection with scheme 500 of FIG. 5, simply multiplying B[27:19] with D[27:10] may not yield the correct result, since the LSBs of B[27:19] and D[27:10] are not aligned—i.e., the LSB of B[27:19] is shifted 9 bits to the right with respect to the LSB of D[27:10]. Accordingly, B[27:19] and D[27:10] may need to be properly aligned before multiplication in order to yield the correct product $BD_T$=B[27:19]D[27:10].

The 18×9 component multiplier 118 of the of the shared block 100 may be modified as follows. The selection circuitry 602 may be used to provide either B'[9:1] or B[27:19] as an input B'[9:1] of the 18×9 component multiplier 118. AND gate circuitry 606 may be used to provide D'[18:10] for the 18 bit long input D'[18:1] of the 18×9 component multiplier 118. A first input of the AND gate circuitry 606 may be D[27:19], and a second input of the AND gate circuitry 606 may be either a 9 bit long vector of zeroes or a 9 bit long vector of ones. A selection circuitry 608 may be used to provide either D[18:10] or D[27:19] as D'[18:10] for the 18 bit long input D'[18:1] of the 18×9 component multiplier 118.

It should be noted that in some embodiments, a two-input selection circuitry 606 may be used in place of AND gate circuitry 606. The two-input selection circuitry 606 may be used to provide D'[9:1] of the 18 bit long input D'[18:1] of the 18×9 component multiplier 118. In these embodiments, a first input of the selection circuitry 606 may be D[27:19], and a second input of the selection circuitry 606 may be a 9 bit long vector of zeroes.

The outputs of the selection circuitries 602 and 608 and the AND gate circuitry 606 may be configured such that D'[18:1]=[0[9:1] & [27:19]] and B'[9:1]=B[27:19], causing the modified 18×9 component multiplier 118 of the shared processing block 100 to output a properly aligned partial product $BD_T$=B[27:19]D[27:19], which may then be combined with the partial products AC, AD and BC. It should be noted that in this embodiment, the modified 18×9 component multiplier 118 of the shared processing block 100 is effectively used as a 9×9 multiplier.

Figure 7:
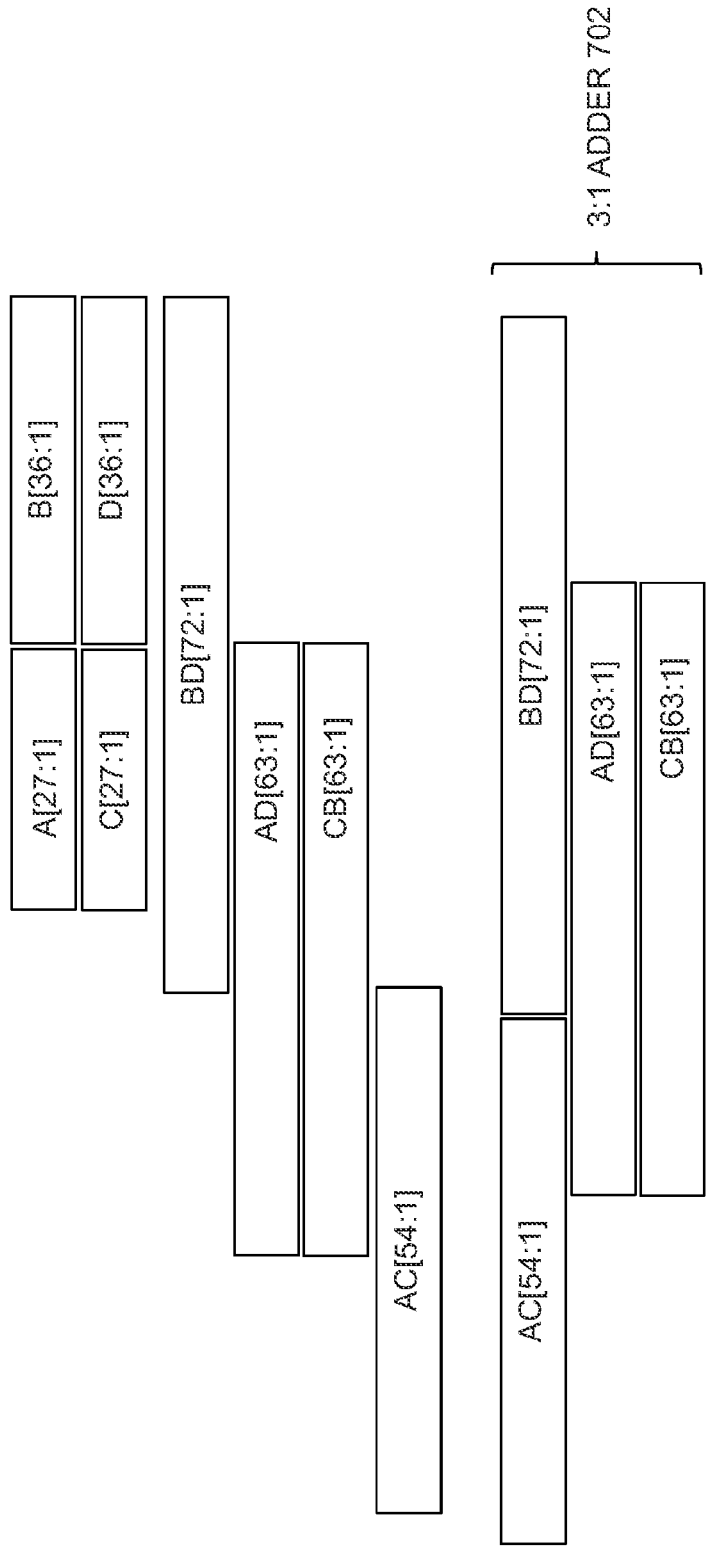
FIG. 7 shows a further exemplary scheme for performing multiplication in accordance with an embodiment of the present disclosure.

FIG. 7 shows an exemplary scheme 700 for performing multiplication in accordance with an embodiment of the present disclosure. In some embodiments, scheme 700 may be implemented using a plurality of processing blocks having a structure that is substantially the same as processing block 100 shown in FIG. 1. However, it will be appreciated by those skilled in the art that scheme 700 may be implemented either independently from or as part of circuitries other than processing block 100 of FIG. 1 without departing from the spirit and scope of the present disclosure.

Scheme 700 relates to performing p×p multiplication—that is, multiplying a first p bit long number AB by a second p bit long number BC. The first number AB is partitioned into an l bit long component A and an m bit long component B. The second number CD is partitioned into an l bit long component C and an m bit long component D. The discussion below relates to embodiments where p=63, l=27 m=36, n=18 and r=9. However, it will be appreciated by those skilled in the art that any suitable values of p, l, m, n and r may be used without departing from the scope of the present disclosure.

A product of the 63 bit long numbers AB and CD may be obtained by partitioning the numbers AB and CD into components A, B, C and D, and computing partial products AC, AD, CB and BD. The partial products AC and BD may then be concatenated, and [AC & BD], AD and CB may be properly aligned and added using a three input adder 702.

Computing a partial product BD of the 36 bit long components C and D involves performing a 36×36 multiplication. Accordingly, as described above, the partial product CD may be computed using two processing blocks 100.

Computing a partial product AC of the 27 bit long components A and C involves performing a 27×27 multiplication. Accordingly, as described above, the partial product AC may be computed using a single processing block 100.

Computing a partial product AD of the 27 bit long component A and the 36 bit long component D involves performing a 36×27 multiplication. Likewise, computing a partial product CB of the 27 bit long component C and the 36 bit long component B involves performing a 36×27 multiplication. The partial products AD and CB may be computed according to schemes substantially similar to schemes 300, 301 and 400 described in connection with FIGS. 3A, 3B and 4. To compute the partial products AD and CB for scheme 700, the schemes 300, 301 and 400 need be modified to switch the components A and B with one another and to switch the components C and D with one another. Accordingly, the partial products AD and CB may be computed using three processing blocks 100.

Thus, when operating in 'full-precision' mode (i.e., when no truncation is involved in the multiplication of the number AB and the number CD) a 63×63 multiplication of the number AB and the number CD according to scheme 700 may be implemented using six processing blocks 100.

Figure 8:
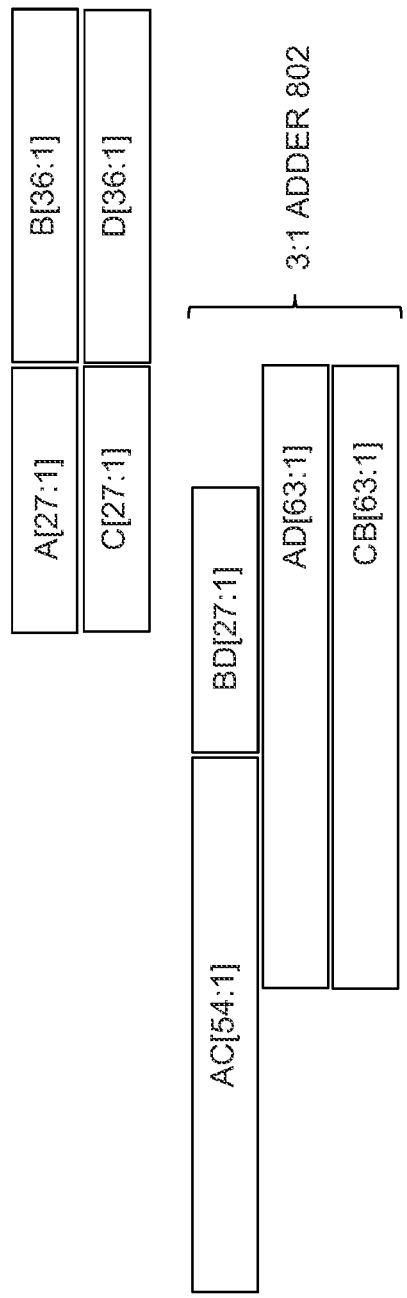
FIG. 8 shows a further exemplary scheme for performing multiplication in accordance with an embodiment of the present disclosure.

FIG. 8 shows an exemplary scheme 800 for performing multiplication in accordance with an embodiment of the present disclosure. In some embodiments, scheme 800 may be implemented using a plurality of processing blocks having a structure that is substantially the same as processing block 100 shown in FIG. 1. However, it will appreciated by those skilled in the art that scheme 800 may be implemented either independently from or as part of circuitries other than processing block 100 of FIG. 1 without departing from the spirit and scope of the present disclosure.

Scheme 800 relates to performing a truncated multiplication of the number AB and the number CD. Like the 'full-precision' 63×63 multiplication scheme 700, scheme 800 partitions the numbers AB and CD into components A, B, C and D, and computes partial products AC, AD and CB, as well as a truncated partial product $BD_T$. The partial products AC and BD are concatenated, and [AC & $BD_T$], AD and CB are properly aligned and added using a three input adder 802.

The partial product AC may be computed according to scheme 700 described in connection with FIG. 7, and may be computed using a single processing block 100.

The partial products AD and CB may be computed according to scheme 700 described in connection with FIG. 7, using three processing blocks 100.

In some embodiments, the partial product $BD_T$=B[36:28] D[36:19]. Accordingly, the partial product $BD_T$ involves an 18×9 multiplication of the 18 bit long component D[36:19] and the 9 bit long component B[36:28].

The partial product $BD_T$ may be computed using a modified 18×9 component multiplier 118 of the right multiplier 114 of the shared processing block 100. D[36:19] may be provided as the 18 bit long input D'[18:1] of the 18×9 component multiplier 118 of the shared processing block 100. A selection circuitry (such as selection circuitry 602 as described above in connection with FIG. 6B) may be used to provide either B'[9:1] or B[36:19] to as the 9 bit long input B'[9:1] of the 18×9 component multiplier 118 of the shared processing block 100. The partial product $BD_T$ output by the modified 18×9 component multiplier 118 is correctly aligned with respect to the partial products AC, AD and BD.

Accordingly, a 63×63 multiplication scheme 800 using a partial product $BD_T$=B[36:28]D[36:19] obtained via 18×9 multiplication may be implemented using 4 processing blocks 100.

In some embodiments, the partial product $BD_T$=B[36:19] D[36:19]. Accordingly, the partial product $BD_T$ involves an 18×18 multiplication of the 18 bit long component D[36:19] and the 18 bit long component B[36:19]. The 18×18 partial product $BD_T$ may be implemented using either a left multiplier 108 or a right multiplier 114 of a single processing block 100 (i.e., using one half of a single processing block 100). Accordingly, a 63×63 multiplication scheme 800 using a partial product $BD_T$=B[36:19]D[36:19] obtained via 18×18 multiplication may be implemented using 4.5 processing blocks 100.

In some embodiments, the partial product $BD_T$=B[36:10] D[36:10]. Accordingly, the partial product $BD_T$ involves an 27×27 multiplication of the 27 bit long component D[27:10] and the 27 bit long component B[27:10]. The 27×27 partial product $BD_T$ may be implemented using a single processing block 100. Accordingly, a 63×63 multiplication scheme 800 using a partial product $BD_T$=B[36:10]D[36:10] obtained via 27×27 multiplication may be implemented using five processing blocks 100.

FIG. 9 shows an illustrative flow diagram of an exemplary process 900 for multiplying a p bit long number AB and a p bit long number CD according to an embodiment of the present disclosure. In some embodiments, process 900 may be performed using a plurality of processing blocks having a structure that is substantially the same as processing block 100 shown in FIG. 1. However, it will appreciated by those skilled in the art that process 900 may be performed either independently from or as part of circuitries other than processing block 100 of FIG. 1 without departing from the spirit and scope of the present disclosure.

At 902, a partial product AD is computed based on multiplying an l bit long component A of the number AB and an m bit long component D of the number CD. The component A includes an r bit long subcomponent $A_H$ and an m bit long subcomponent $A_L$. As part of computing the partial product AD, the m bit long component D and the m bit long subcomponent $A_L$ are multiplied using a first multiplier circuitry of a plurality of multiplier circuitries. Each multiplier circuitry of the plurality of multiplier circuitries includes an n×n left multiplier. The n×n left multiplier includes a first n×r component multiplier and a second n×r component multiplier. Each multiplier circuitry of the plurality of multiplier circuitries further includes an n×n right multiplier. The n×n right multiplier includes an n×r component multiplier an m×r component multiplier.

At 904, as part of computing the partial product AD, the m bit long component D and the r bit long subcomponent $A_H$ are multiplied using an n×n left multiplier of a second multiplier circuitry of the plurality of multiplier circuitries.

At 906, a partial product BC is computed based on multiplying an l bit long component C of the number CD and an m bit long component B of the number AB, where the component C comprises an r bit long subcomponent $C_H$ and an m bit long subcomponent $C_L$. As part of computing the partial product BC, the m bit long component B and the m bit long subcomponent $C_L$ are multiplied using a third multiplier circuitry of the plurality of multiplier circuitries.

At 908, as part of computing the partial product BC, the m bit long component B and the r bit long subcomponent $C_H$ are multiplied using an n×n right multiplier of the second multiplier circuitry of the plurality of multiplier circuitries.

Advantageously, the schemes, circuitries and processes described in FIGS. 2, 3A, 3B, 4, 7 and 9 allow for an implementation of an enhanced standard-compliant multiplication scheme (i.e., multiplication scheme compliant with, e.g., the IEEE 754, OpenCL and ADSPB standards) based on a 63×63 multiplier, which uses six processing blocks 100 to implement. Advantageously, the enhanced standard-compliant multiplication scheme uses fewer resources (i.e., two fewer processing blocks 100) than the 'standard' standard-compliant multiplication scheme.

Advantageously, the schemes, circuitries and processes described in FIGS. 2, 3A, 3B, 4, 5, 6A, 6B, 6C, 7, 8 and 9 allow for an implementation of the enhanced standard-compliant multiplication scheme while requiring no datapath changes, and only small logic changes to the left multipliers 108 and the right 18×18 multipliers 114 of the processing blocks 100 (e.g., the addition of several 2:1 multiplexors and AND gates).

Advantageously the schemes, circuitries and processes described in described in FIGS. 2, 3A, 3B, 4, 5, 6A, 6B, 6C, 7, 8 and 9 allow for implementation of a truncated multiplication, yielding additional resource savings. For example, in some embodiments, truncated multiplication may be performed using 4, 4.5, 5, or 5.5 processing blocks 100. In addition, implementations of the truncated multiplication processes, schemes and circuitries may be standard-compliant, while requiring only small additional modifications (relative to the 63×63 schemes and circuitries) of the right 18×18 multipliers 114 of the processing blocks 100.

Advantageously the schemes, circuitries and processes described in described in FIGS. 2, 3A, 3B, 4, 5, 6A, 6B, 6C, 7, 8 and 9 may be fully backward compatible with existing DSP circuit designs based on the processing blocks 100, while being 'transparent' (i.e., appearing as unmodified implementations of processing blocks 100) to any existing circuit designs or implementations.

The foregoing is merely illustrative of the principles of the embodiments and various modifications can be made by those skilled in the art without departing from the scope and spirit of the embodiments disclosed herein. The above described embodiments of the present disclosure are presented for purposes of illustration and not of limitation, and the present invention is limited only by the claims which follow.

What is claimed is:

1. A system comprising:
a plurality of multiplier circuitries; and
control circuitry configured to multiply a number AB and a number CD, wherein:
the number AB comprises a component A and a component B, and the component A comprises a subcomponent $A_H$ and a subcomponent $A_L$, and
the number CD comprises a component C and a component D, and the component C comprises a subcomponent $C_H$ and a subcomponent $C_L$, and
the control circuitry is configured to:
compute a partial product AD based on multiplying the component D and the subcomponent $A_L$ using a first multiplier circuitry of the plurality of multiplier circuitries and based on multiplying the component D and the subcomponent $A_H$ using a first multiplier module of a second multiplier circuitry of the plurality of multiplier circuitries; and
compute a partial product CB based on multiplying the component B and the subcomponent $C_L$ using a third multiplier circuitry of the plurality of multiplier circuitries and based on multiplying the component B and the subcomponent $C_H$ using a second multiplier module of the second multiplier circuitry of the plurality of multiplier circuitries.

2. The system of claim 1, wherein each multiplier circuitry of the plurality of multiplier circuitries comprises:
an n×n left multiplier comprising:
a first n×r component multiplier; and
a second n×r component multiplier; and
an n×n right multiplier comprising:
an n×r component multiplier; and
an m×r component multiplier; and wherein:
the number AB is p bits long, the component A is l bits long, the component B is m bits long, the subcomponent $A_H$ is r bits long and the subcomponent $A_L$ is m bits long,
the number CD is p bits long, the component C is l bits long, the component D is m bits long, the subcomponent $C_H$ is r bits long and the subcomponent $C_L$ is m bits long,
the first multiplier module of the second multiplier circuitry of the plurality of multiplier circuitries is the n×n left multiplier of the second multiplier circuitry of the plurality of multiplier circuitries, and
the second multiplier module of the second multiplier circuitry of the plurality of multiplier circuitries is the n×n right multiplier of the second multiplier circuitry of the plurality of multiplier circuitries.

3. The system of claim 2, wherein l=4r m=3r and n=2r.

4. The system of claim 2, wherein the control circuitry is further configured to:
multiply the m bit long component D and the r bit long subcomponent $A_H$ using a first n×r component multiplier and a second n×r component multiplier of the n×n left multiplier of the second multiplier circuitry of the plurality of multiplier circuitries; and
multiply the m bit long component B and the r bit long subcomponent $C_H$ the using an m×r component multiplier of the n×n right multiplier of the second multiplier circuitry of the plurality of multiplier circuitries.

5. The system of claim 2, wherein the component D comprises an r bit long subcomponent $D_H$ and an n bit long subcomponent $D_L$, and wherein computing the partial product AD further comprises:
multiplying the n bit long subcomponent $D_L$ and the r bit long subcomponent $A_H$ using a first n×r component multiplier of the n×n left multiplier of the second multiplier circuitry of the plurality of multiplier circuitries; and
multiplying the r bit long subcomponent $D_H$ and the r bit long subcomponent $A_H$ using a second n×r component multiplier of the n×n left multiplier of the second multiplier circuitry of the plurality of multiplier circuitries.

6. The system of claim 5, wherein the control circuitry further comprises:
first selection circuitry, wherein:
a first input of the first selection circuitry comprises r least significant bits of the subcomponent $D_L$,
a second input of the first selection circuitry comprises an r bit long vector of zeros, and
an output of the first selection circuitry is coupled to r least significant bits of an n bit long input of the second n×r component multiplier of the n×n left multiplier of the second multiplier circuitry of the plurality of multiplier circuitries;
second selection circuitry, wherein:
a first input signal of the second selection circuitry comprises r most significant bits of the n bit long subcomponent $D_L$,
a second input signal of the second selection circuitry comprises the r bit long subcomponent $D_H$,
an output of the selection circuitry is coupled to r most significant bits of the n bit long input of the second n×r component multiplier of the n×n left multiplier of the second multiplier circuitry of the plurality of multiplier circuitries; and
third selection circuitry, wherein:
a first input signal of the third selection circuitry comprises an r bit long input signal,
a second input signal of the third selection circuitry comprises the r bit long subcomponent $A_H$, and
an output of the selection circuitry is coupled to r most significant bits of the r bit long input of the second n×r component multiplier of the n×n left multiplier of the second multiplier circuitry of the plurality of multiplier circuitries.

7. The system of claim 5, wherein:
the second input of the first selection circuitry comprises the r bit long vector of zeros or an r bit long vector of ones, and
the first selection circuitry is a two input AND circuitry.

8. The system of claim 2, wherein the control circuitry is further configured to:
compute a partial product AC based on multiplying the l bit long component A and the l bit long component C using a fourth multiplier circuitry and a fifth multiplier circuitry of the plurality of multiplier circuitries;
compute a partial product BD based on multiplying the m bit long component B and the m bit long component D using a sixth multiplier circuitry of the plurality of multiplier circuitries; and
compute a product R of the number AB and the number CD based on the computed partial products BD, AD, BC and AC.

9. The system of claim 8, wherein R[m:1] is BD[m:1] and wherein the control circuitry further comprises:
first two-input adder circuitry configured to compute R[2m:m+1] by adding BD[2m:m+1] and a sum of AD[m:1] and BC[m:1];
first three-input adder circuitry configured to compute R[p+m+2:2m+1] by adding AC[p−m], a sum of AD[p:p−m] and BC[p:p−m] preceded by 10 zeros, and a sum of a product of A[l:m+1] and D[m+1:1] and a product of C[l:m+1] and B[m+1:1]; and
second two-input adder circuitry configured to compute R[2p+2:p+m+3] by adding AC[2l:p−m+1] and a carry-in from the first three-input adder circuitry.

10. The system of claim 2, wherein the control circuitry is further configured to:
compute a truncated partial product BD based on multiplying r most significant bits of the m bit long component B and n most significant bits of the m bit long component D using an n×r component multiplier of the of the n×n right multiplier of the second multiplier circuitry of the plurality of multiplier circuitries.

11. The system of claim 10, the component D comprises an r bit long subcomponent $D_H$ and an n bit long subcomponent $D_L$, and wherein the control circuitry further comprises:
first selection circuitry, wherein:
a first input of the first selection circuitry comprises the r bit long subcomponent $D_H$,
a second input of the first selection circuitry comprises an r bit long vector of zeros, and
an output of the first selection circuitry is coupled to r least significant bits of an n bit long input of the n×r component multiplier of the n×n right multiplier of the second multiplier circuitry of the plurality of multiplier circuitries;
second selection circuitry, wherein:
a first input signal of the second selection circuitry comprises r most significant bits of the n bit long subcomponent $D_L$,
a second input signal of the second selection circuitry comprises the r bit long subcomponent $D_H$,
an output of the third selection circuitry is coupled to r least significant bits of the n bit long input of the n×r component multiplier of the n×n right multiplier of the second multiplier circuitry of the plurality of multiplier circuitries; and
third selection circuitry, wherein:
a first input signal of the third selection circuitry comprises r least significant bits of the component B,
a second input signal of the third selection circuitry comprises r most significant bits of the component B, and
an output of the third selection circuitry is coupled to an r bit long input of the n×r component multiplier of the n×n right multiplier of the second multiplier circuitry of the plurality of multiplier circuitries.

12. The system of claim 10, wherein the control circuitry further comprises:
a multiplexer configured to shift the truncated partial product BD, wherein a least significant bit of the shifted partial product BD lines up with a least significant bit of the partial product AD.

13. The system of claim 10, wherein the control circuitry is further configured to:
compute a truncated partial product BD by multiplying n most significant bits of the m bit long component B and n most significant bits of the m bit long component D using an n×n left multiplier of a fourth multiplier circuitry of the plurality of multiplier circuitries or the n×n right multiplier of the fourth multiplier circuitry of the plurality of multiplier circuitries.

14. The system of claim 2, wherein l=3r m=4r and n=2r.

15. The system of claim 14, wherein the control circuitry is further configured to:
compute a truncated partial product BD based on multiplying r most significant bits of the m bit long component B and n most significant bits of the m bit long component D using an n×r component multiplier of the of the n×n right multiplier of the second multiplier circuitry of the plurality of multiplier circuitries.

16. The system of claim 14, wherein the control circuitry is further configured to:
compute a truncated partial product BD based on multiplying n most significant bits of the m bit long component B and n most significant bits of the m bit long component D using an n×n left multiplier of a fourth multiplier circuitry of the plurality of multiplier circuitries or an n×n right multiplier of the fourth multiplier circuitry of the plurality of multiplier circuitries.

17. The system of claim 14, wherein the control circuitry is further configured to:
compute a truncated partial product BD based on multiplying l most significant bits of the m bit long component B and l most significant bits of the m bit long component D using a fourth multiplier circuitry of the plurality of multiplier circuitries.

18. Multiplier circuitry comprising:
a first multiplier module;
a second multiplier module comprising:
a first component multiplier of the second multiplier module; and
a second component multiplier of the second multiplier module; and
selection circuitry configured to provide, to the second component multiplier of the second multiplier module, an input signal from a group consisting of an input signal to the first component multiplier of the second multiplier module, an input signal to the first multiplier module, a low logical state signal vector and a high logical state signal vector.

19. The multiplier circuitry of claim 18 further comprising:
receiver circuitry configured to receive:
an r bit long subcomponent $A_H$ of an l bit long component A of a p bit long number AB;
an m bit long component D of the p bit long number CD, wherein the component D comprises an r bit long subcomponent $D_H$ and an n bit long subcomponent $D_L$;
an n×n left multiplier, wherein:
the n×n left multiplier is the second multiplier module,
the first component multiplier of the n×n left multiplier is an n×r multiplier, and
the second component multiplier of the n×n left multiplier is an n×r multiplier;
first selection circuitry, wherein:
a first input of the first selection circuitry comprises r least significant bits of the subcomponent $D_L$,
a second input of the first selection circuitry comprises an r bit long vector of zeros, and
an output of the first selection circuitry is coupled to r least significant bits of an n bit long input of the second n×r component multiplier of the n×n left multiplier; second selection circuitry, wherein:
a first input signal of the second selection circuitry comprises r most significant bits of the n bit long subcomponent $D_L$,
a second input signal of the second selection circuitry comprises the r bit long subcomponent $D_H$,
an output of the selection circuitry is coupled to r most significant bits of the n bit long input of the second n×r component multiplier of the n×n left multiplier; and
third selection circuitry, wherein:
a first input signal of the third selection circuitry comprises an r bit long input signal,
a second input signal of the third selection circuitry comprises the r bit long subcomponent $A_H$, and
an output of the selection circuitry is coupled to r most significant bits of the r bit long input of the second n×r component multiplier of the n×n left multiplier.

20. The multiplier circuitry of claim 19, wherein the receiver circuitry is further configured to receive an m bit long component B of the p bit long number AB and an r bit long subcomponent $C_H$ of an l bit long component C of a p bit long number CD, the system further comprising:
an n×n right multiplier, wherein the n×n right multiplier is the first multiplier module, the n×n right multiplier further comprising:
an n×r component multiplier, and
an m×r component multiplier; and
first selection circuitry, wherein:
a first input of the first selection circuitry comprises the r bit long subcomponent $D_H$,
a second input of the first selection circuitry comprises an r bit long vector of zeros, and
an output of the first selection circuitry is coupled to r least significant bits of an n bit long input of the n×r component multiplier of the n×n right multiplier;
second selection circuitry, wherein:
a first input signal of the second selection circuitry comprises r most significant bits of the n bit long subcomponent $D_L$,
a second input signal of the second selection circuitry comprises the r bit long subcomponent $D_H$,
an output of the third selection circuitry is coupled to r least significant bits of the n bit long input of the n×r component multiplier of the n×n right multiplier; and
third selection circuitry, wherein:
a first input signal of the third selection circuitry comprises r least significant bits of the component B,
a second input signal of the third selection circuitry comprises r most significant bits of the component B, and
an output of the third selection circuitry is coupled to an r bit long input of the n×r component multiplier of the n×n right multiplier.

21. A method for multiplying a number AB and a number CD, the method comprising:
computing a partial product AD based on multiplying a component A of the number AB and a component D of the number CD, wherein the component A comprises a subcomponent $A_H$ and a subcomponent $A_L$, and wherein computing the partial product AD comprises:
multiplying the component D and the subcomponent $A_L$ using a first multiplier circuitry of a plurality of multiplier circuitries
multiplying the component D and the subcomponent $A_H$ the using a first multiplier module of a second multiplier circuitry of the plurality of multiplier circuitries; and
computing a partial product BC based on multiplying a component C of the number CD and a component B of the number AB, wherein the component C comprises a subcomponent $C_H$ and a subcomponent $C_L$, and wherein computing the partial product BC comprises:
multiplying the component B and the subcomponent $C_L$ using a third multiplier circuitry of the plurality of multiplier circuitries; and
multiplying the component B and the subcomponent $C_H$ the using a second multiplier module of the second multiplier circuitry of the plurality of multiplier circuitries.

22. The method of claim 21 wherein each multiplier circuitry of the plurality of multiplier circuitries comprises:

an n×n left multiplier comprising:
a first n×r component multiplier; and
a second n×r component multiplier; and
an n×n right multiplier comprising:
an n×r component multiplier; and
an m×r component multiplier; and wherein:
the number AB is p bits long, the component A is l bits long, the component B is m bits long, the subcomponent $A_H$ is r bits long and the subcomponent $A_L$ is m bits long,
the number CD is p bits long, the component C is l bits long, the component D is m bits long, the subcomponent $C_H$ is r bits long and the subcomponent $C_L$ is m bits long,
the first multiplier module of the second multiplier circuitry of the plurality of multiplier circuitries is a n×n left multiplier of the second multiplier circuitry of the plurality of multiplier circuitries, and
the second multiplier module of the second multiplier circuitry of the plurality of multiplier circuitries is a n×n right multiplier of the second multiplier circuitry of the plurality of multiplier circuitries.

* * * * *